Feb. 15, 1927.
G. A. MILES
1,617,536
LAWN MOWER SHARPENER
Filed July 1, 1925
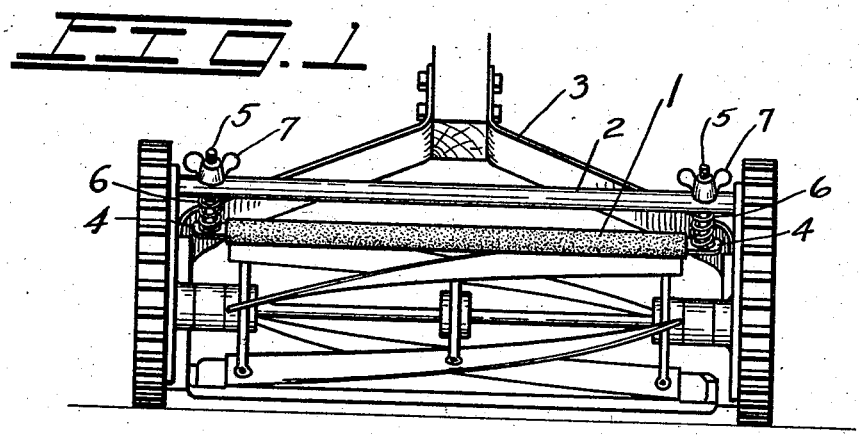
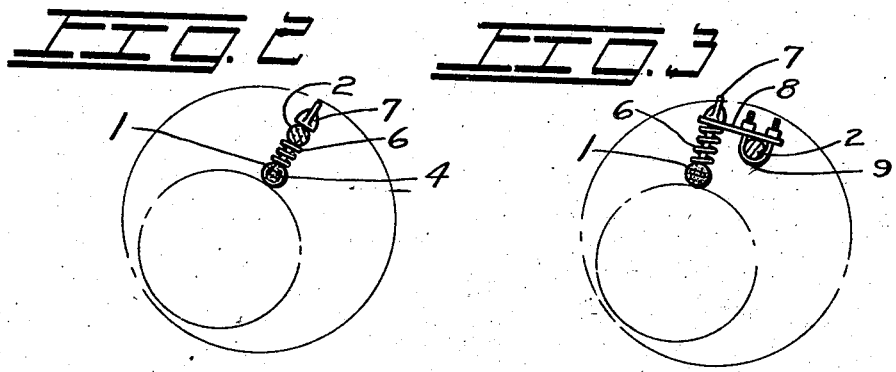
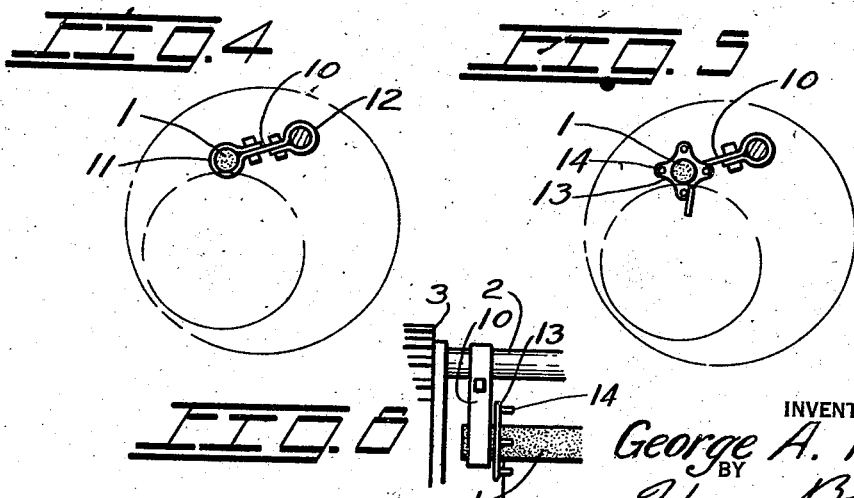
INVENTOR
George A. Miles
BY
Harry Bowen
ATTORNEY Patented Feb. 15, 1927.

1,617,536

UNITED STATES PATENT OFFICE.

GEORGE ARTHUR MILES, OF SEATTLE, WASHINGTON.

LAWN-MOWER SHARPENER.

Application filed July 1, 1925. Serial No. 40,906.

The invention is an automatic means for sharpening lawn mowers as they are used.

The object of the invention is to provide a simple device that may readily be attached to lawn mowers or the like which will automatically sharpen the blades as the machine is used.

Another object of the invention is to provide a sharpening device that may readily be attached to lawn mowers or the like, which is resiliently held in relation to the blades.

And a further object of the invention is to provide a means for rotating a device that may readily be attached to lawn mowers or the like for sharpening the blades automatically.

With these ends in view, the invention embodies a round, sharpening stone, and a resilient means for attaching it to lawn mowers or the like so that the blades will engage it as they rotate.

Other features and advantages of the invention will appear from the following description, taken in connection with the drawing, wherein:—

Figure 1 is a front view of the lawn mower, showing the device in place.

Figure 2 is a cross section showing the means for attaching the sharpening stones to the cross bar of the machine.

Figure 3 is a similar view showing an alternate attachment.

Figure 4 is a similar view showing another alternate attachment.

Figure 5 is a cross section showing an attachment which causes the stone to rotate.

Figure 6 is a detail showing the front view of the attachment shown in Figure 5.

In the drawings I have shown my device as it would be constructed wherein numeral 1 indicates the sharpening stone, numeral 2 the stationary bar to which the stone is attached and numeral 3 a lawn mower, which may be of any suitable type or design.

The stone 1, which may also be of any suitable type or design is provided with flat projections 4 at the ends with bolts 5 extending from them through the stationary bar 2. Springs 6 are placed around the bolts 5 to resiliently hold the stone 1 downward and thumb nuts 7 are placed on the ends of the bolts 5 to hold the stone against the springs and to also provide means for adjusting the position of the stone. It will be observed that with the stone engaging the edges of the blades as shown in Figure 2, the blades will be automatically sharpened as they rotate.

In Figure 3 the bolts 5 are held in a plate 8 that is held to the bar 2 by U bolts 9 and it will be observed that the position of the stone may readily be adjusted by either the U bolt or the thumb screws 7.

In the design shown in Figure 4, the stone 1 is supported in a clamp 10 which is formed with a flat metal band having clamps 11 and 12 at the end as shown. The band will have a certain amount of spring to provide sufficient resiliency and it will be observed that its position may readily be adjusted through the clamp 12.

In the design shown in Figure 5, the stone is rotatably held in the clamp 10 and the end of the stone is provided with a spider 13 having projections 14 extending from it which engage the blades as they pass and thereby cause the stone to rotate.

It will be understood that changes may be made in the construction without departing from the spirit of the invention. One of which changes may be in the use of a stone of any other diameter or shape, another may be in the means for supporting the stone and still another may be in the use of any suitable means for causing the stone to rotate.

Having thus fully described the invention, what I claim as new and desire to secure by Letters Patent, is:—

In a sharpening device of the class described a stone, a means for resiliently and adjustably supporting the stone from a lawn mower frame, the stone provided with a spider having projections extending from it which engage the blades of the lawn mower as they pass and thereby cause the stone to automatically rotate.

GEORGE ARTHUR MILES.